(12) United States Patent
Ishihara

(10) Patent No.: US 6,417,759 B2
(45) Date of Patent: Jul. 9, 2002

(54) EXHAUST GAS RECIRCULATION SENSOR

(75) Inventor: Kanji Ishihara, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 09/885,987

(22) Filed: Jun. 21, 2001

(30) Foreign Application Priority Data

Jun. 30, 2000 (JP) ........................................ 2000-203086

(51) Int. Cl.[7] .............................................. H01C 10/38
(52) U.S. Cl. ...................................... 338/176; 338/153
(58) Field of Search ................................. 338/118, 176, 338/194, 153

(56) References Cited

U.S. PATENT DOCUMENTS

| 5,072,206 | A | | 12/1991 | Kozuka et al. |
| 5,095,299 | A | | 3/1992 | Wakamatsu |
| 5,345,215 | A | | 9/1994 | Okumura et al. |
| 6,034,590 | A | * | 3/2000 | Ishihara ...................... 338/183 |
| 6,051,897 | A | * | 4/2000 | Wissler et al. ................. 310/14 |
| 6,024,749 | A1 | * | 3/2001 | Ishihara ...................... 338/176 |

\* cited by examiner

*Primary Examiner*—Karl D. Easthom
(74) *Attorney, Agent, or Firm*—Beyer Weaver & Thomas, LLP

(57) ABSTRACT

An operating shaft is provided in its rear side portion with a convex portion protruding from a shaft portion in the direction orthogonal to an axial direction. A bearing portion is provided with a concave portion connected to a hole through which the shaft portion is inserted and allowing the convex portion to be inserted therethrough in the axial direction. The convex portion protruding from a rear end of the bearing portion is retained to the rear end of the bearing portion other than the concave portion. The operating shaft can be finally assembled. Like a coil spring, a movable member, and a cover, the operating shaft can be assembled in a stacking manner. It is thus possible to provide an EGR sensor which has good productivity and is inexpensive, as compared with a conventional EGR sensor.

3 Claims, 10 Drawing Sheets

EXHAUST GAS RECIRCULATION SENSOR

BACKGROUND OF THE INVENTION

1. Field of the Invention

The present invention relates to an exhaust gas recirculation sensor for controlling an amount of the recycling of exhaust gas from an automobile. The exhaust gas recirculation will be hereinafter referred to as EGR.

2. Description of the Prior Art

A conventional EGR sensor will be described with reference to FIGS. 12 to 14. A case 31 consisting of a mold of synthetic resin has a hollow housing portion 31a with its one side opened, a pair of concave shoulder portions 31b extending in the front to rear direction in the housing portion 31a, a pair of right and left guide portions 31c located above the shoulder portions 31b and extending in the front to rear direction in the housing portion 31a, and a tubular portion 31d protruding in the direction normal to the housing portion 31a.

An insulating substrate 33 provided with a plurality of metal terminals 32 is mounted with a hole IC 34 connected electrically to the terminals 32. The insulating substrate 33 is inserted into a pair of the shoulder portions 31b of the case 31 to be mounted in the housing portion 31a.

The terminals 32 mounted onto the insulating substrate 33 are soldered and connected to one end of an L-shaped pin 35 for connector embedded into the case 31.

A cover 36 consisting of a mold of synthetic resin has a bearing portion 36b provided in its center portion with a circular hole 36a and a convex portion 36c provided in the rear side portion of the outer circumference thereof. The cover 36 is mounted by fitting the convex portion 36c into the case 31 so as to cover the opening portion of the case 31.

An operating shaft 37 has a cylindrical shaft portion 37a, a stopper portion 37b provided at the rear side of the shaft portion 37a, and a convex portion 37c provided in the rear end of an axial direction G2. The shaft portion 37a is guided through the hole 36a of the cover 36 so as to move the operating shaft 37 linearly. The stopper portion 37b is contacted onto a rear end 36d of the bearing portion 36b so as to prevent the operating shaft 37 from coming off the bearing portion 36b.

To assemble the operating shaft 37, the shaft portion 37a is first inserted from the rear side of the cover 36 through the hole 36a. Then, the stopper portion 37b is retained to the rear end 36d of the cover 36, and the operating shaft 37 is combined with the cover 36. Thereafter, while both are combined with each other, the cover 36 is assembled into the case 31.

A movable member 38 consisting of a mold of synthetic resin has a rectangular base portion 38a located in the center, a pair of spring receiving portion 38b extending from the base portion 38a to right and left and each having in its end a cross portion, and four sliding portions 38c each provided at the right or left side in the front or rear position of the base portion 38a.

In addition, the movable member 38 is provided in its lower portion with a magnet 39. The movable member 38 provided with the magnet 39 is mounted onto the case 31 so as to be moved linearly while the magnet 39 is opposite to the hole IC 34 and the sliding portions 38c are located in the guide portion 31c of the case 31.

The magnet 39 and the hole IC 34 construct detection means K2.

Two coil springs 40 are disposed in the housing portion 31a so that one end of each of the coil springs 40 is contacted onto a back surface wall 31e, and the other end is contacted onto the spring receiving portion 38b of the movable member 38.

The two coil springs 40 bias the movable member 38 forward. The center portion of the movable member 38 is thus contacted resiliently onto the convex portion 37c of the operating shaft 37. The stopper portion 37b is contacted onto the rear end 36d of the bearing portion 36b to prevent the operating shaft 37 from coming off the bearing portion 36b.

The operation of the conventional EGR sensor will be described. A rod for driving the EGR valve of an automobile pushes the operating shaft 37 against the coil springs 40. The operating shaft 37 allows the movable member 38 to be guided by a guide portion 31c and to move linearly in the axial direction G2.

The magnet 39 is also moved to fluctuate the magnetic field to the hole IC 34. As a result, the detection means K2 varies the electric current value so as to detect an amount of the operating shaft 37 moved.

When the pushing of the operating shaft 37 by the rod is released, the coil springs 40 push back the movable member 38, and the operating shaft 37 is also pushed back into the original state by the movable member 38.

Thus, the conventional EGR sensor can be operated.

In the convention EGR sensor, while the operating shaft 37 is assembled into the bearing portion 36b of the cover 36, the cover 36 is mounted onto the case 31. The assembling operation is troublesome, so that the productivity is poor, and the cost is high.

Further, in the EGR sensor, in the case where the operating shaft 37 is found to be scratched in quality inspection before shipping, the operating shaft 37 must be replaced. The cover 36 must be removed during the replacement. The replacement operation is troublesome, so that, substantially, the EGR sensor must be discarded, and parts other than the operating shaft 37 are wasted.

SUMMARY OF THE INVENTION

Accordingly, an object of the present invention is to provide an EGR sensor which facilitates the assembling operation and can easily replace the operating shaft.

As a first solving means for solving the foregoing problems, an exhaust gas recirculation sensor comprises an operating shaft movable linearly in the axial direction, a bearing portion for guiding movement of the operating shaft, a movable member movable linearly by the operating shaft, a spring member for returning movement of the movable member and biasing the movable member so as to resiliently contact the movable member onto the operating shaft, a case for guiding movement of the movable member, and detection means operated by movement of the movable member, wherein the operating shaft is provided in its rear portion with a convex portion protruding from a shaft portion in the direction orthogonal to the axial direction, the bearing portion is provided with a concave portion connected to a hole through which the shaft portion is inserted and allowing the convex portion to be inserted therethrough in the axial direction, and the convex portion protruding from the rear end of the bearing portion is retained to the rear end of the bearing portion other than the concave portion.

As a second solving means, the rear end of the bearing portion is provided with blocking portions for blocking movement of the convex portion to the concave portion.

As a third solving means, the blocking portions are formed by protrusions provided at both sides of the concave portion.

PREFERRED EMBODIMENTS OF THE INVENTION

Figure 1:
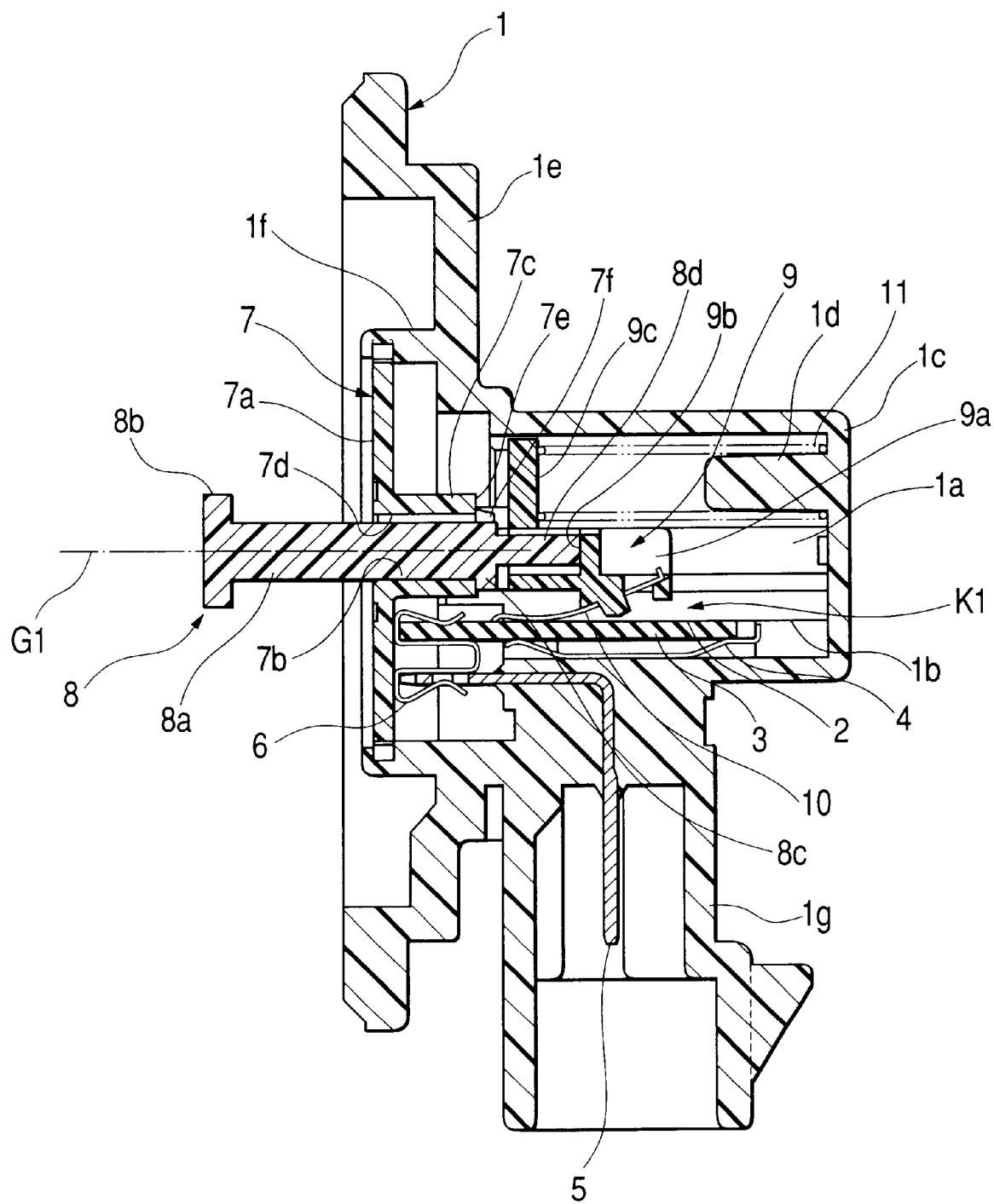
FIG. 1 is a cross-sectional view of an EGR sensor of the present invention viewed from the side thereof.
Figure 2:
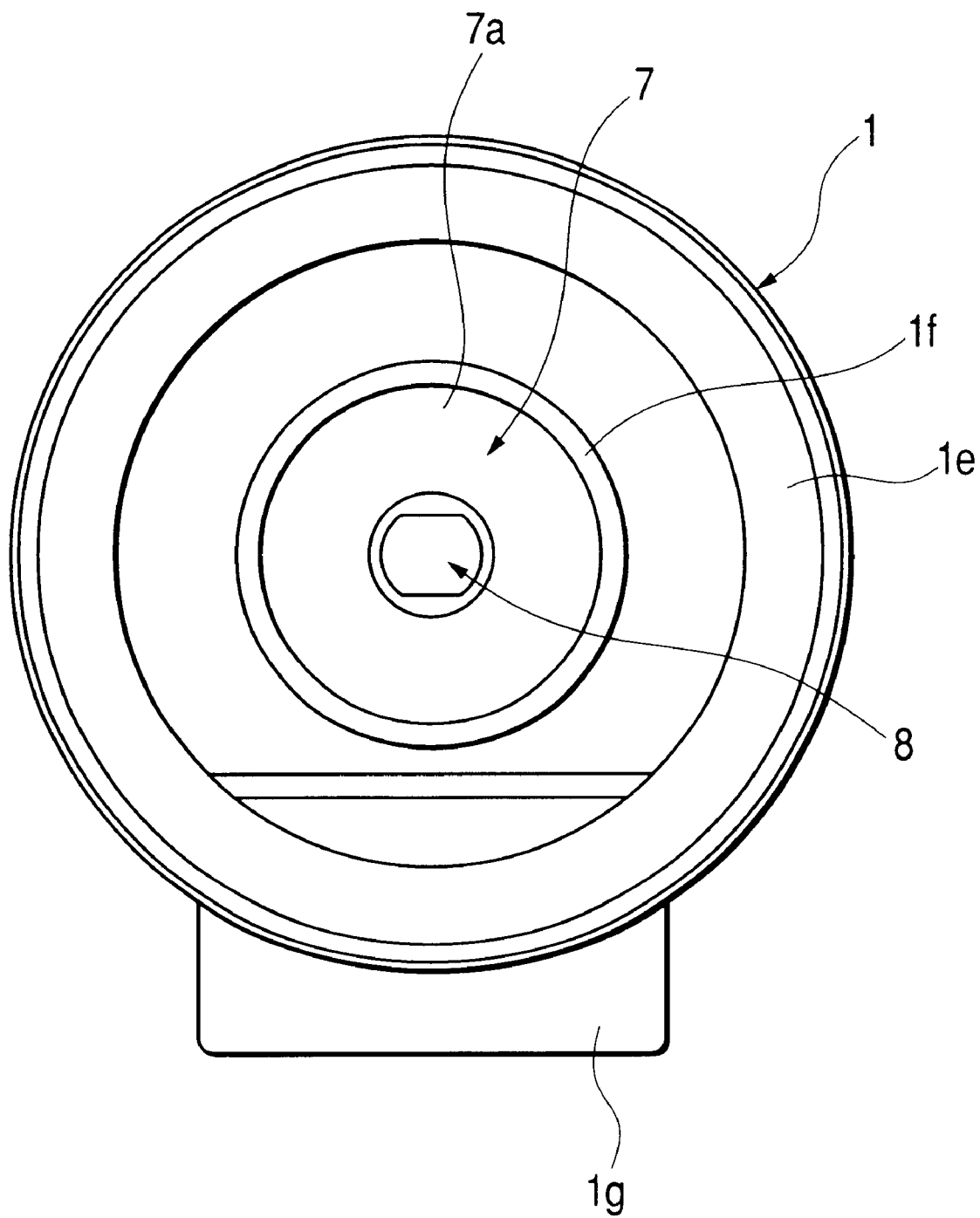
FIG. 2 is a front view of the EGR sensor of the present invention.
Figure 3:
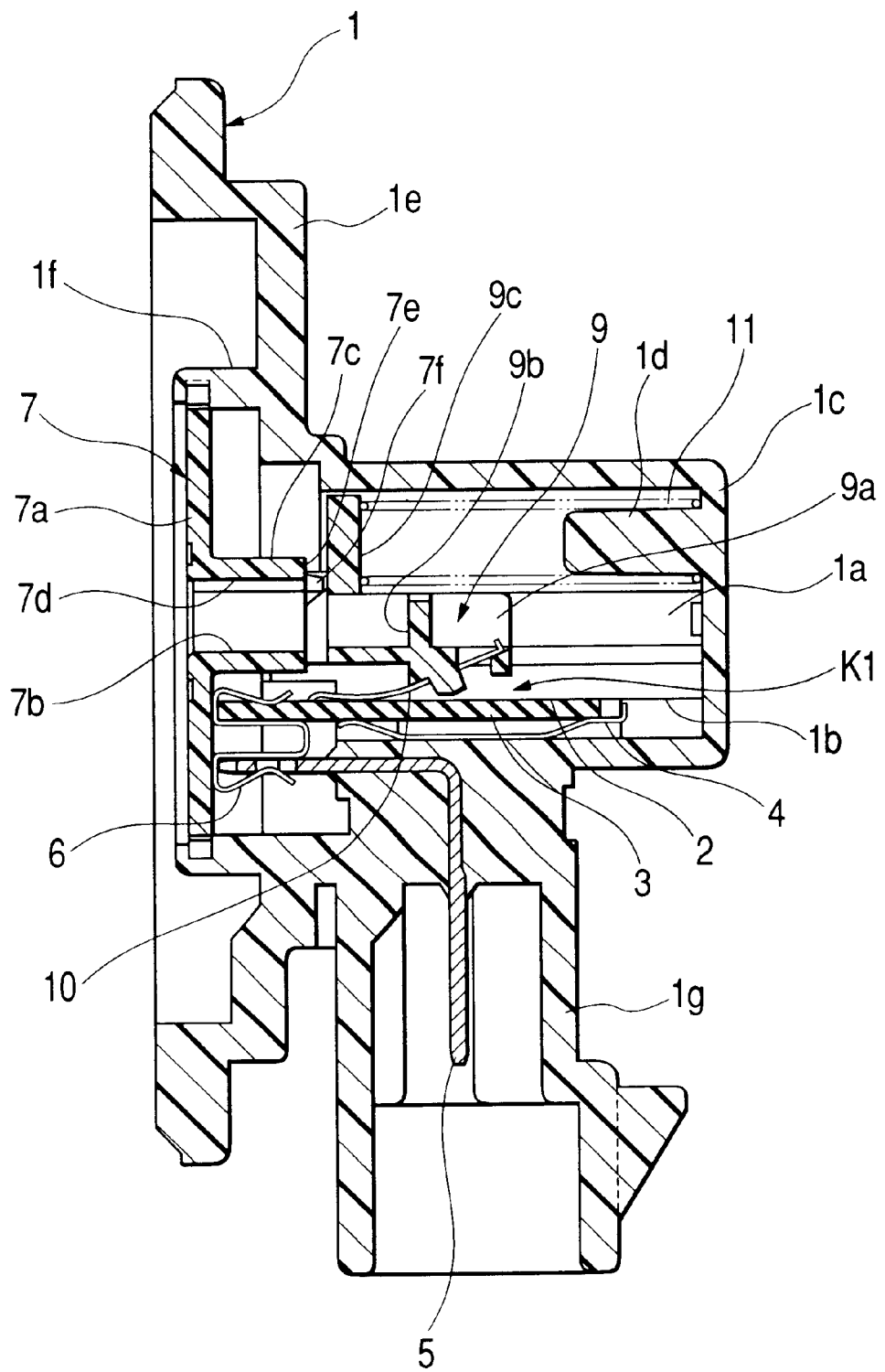
FIG. 3 is a cross-sectional view showing the EGR sensor of the present invention before an operating shaft is assembled thereinto.
Figure 4:
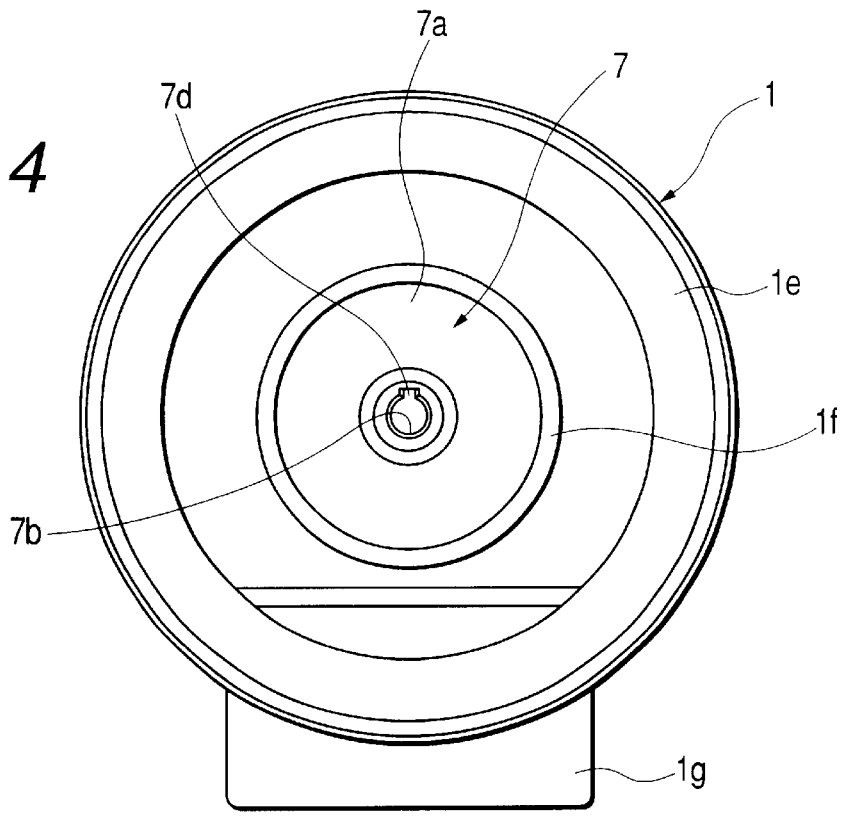
FIG. 4 is a front view showing the EGR sensor of the present invention before the operating shaft is assembled thereinto.
Figure 5:
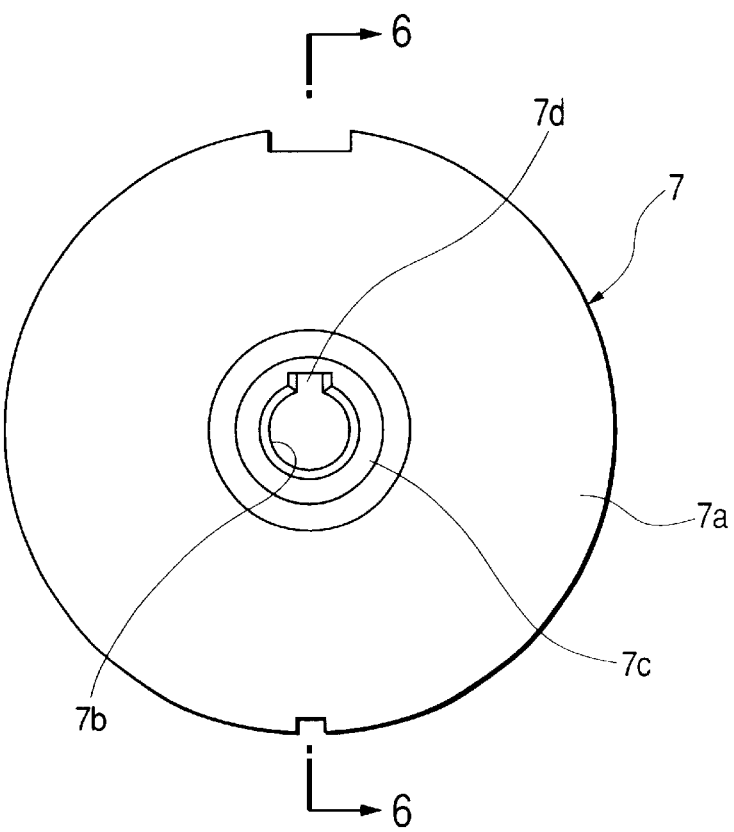
FIG. 5 is a front view of a cover according to the EGR sensor of the present invention.
Figure 6:
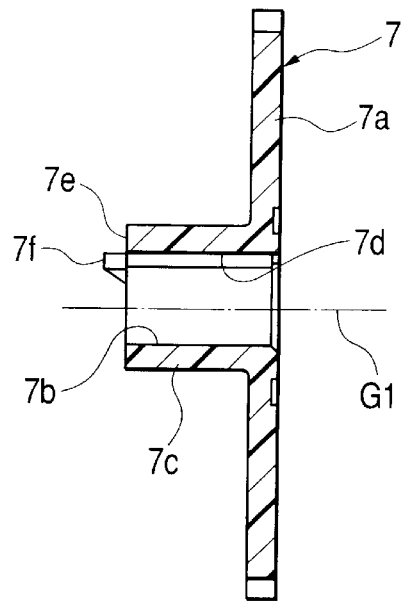
FIG. 6 is a cross-sectional view taken along line 6—6 of FIG. 5.
Figure 7:
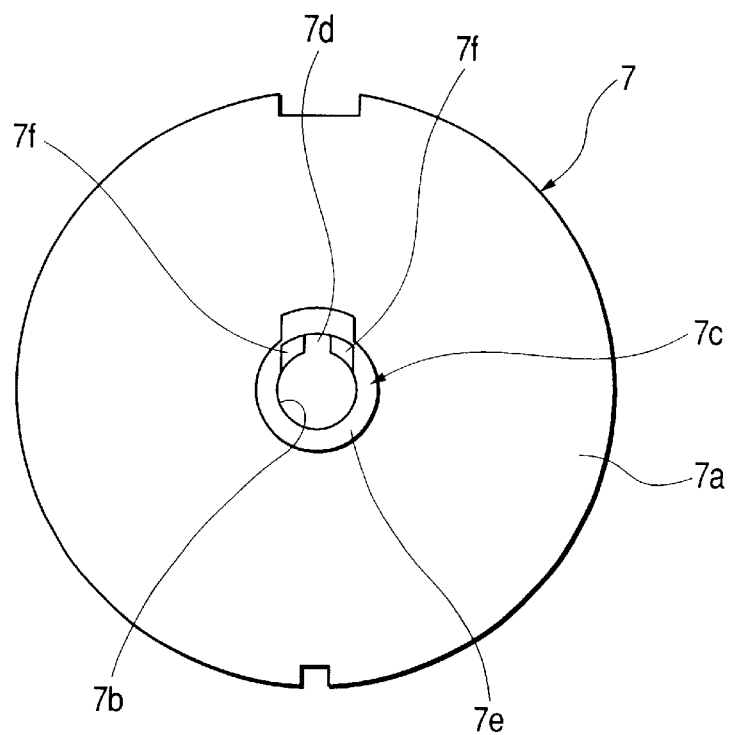
FIG. 7 is a back surface view of the cover according to the EGR sensor of the present invention.

The drawings of the EGR sensor of the present invention will be described. FIG. 1 is a cross-sectional view of the EGR sensor of the present invention viewed from the side thereof. FIG. 2 is a front view of the EGR sensor of the present invention. FIG. 3 is a cross-sectional view showing the EGR sensor of the present invention before an operating shaft is assembled thereinto. FIG. 4 is a front view showing the EGR sensor of the present invention before the operating shaft is assembled thereinto. FIG. 5 is a front view of a cover according to the EGR sensor of the present invention. FIG. 6 is a cross-sectional view taken along line 6—6 of FIG. 5. FIG. 7 is a back surface view of the cover according to the EGR sensor of the present invention.

Figure 8:
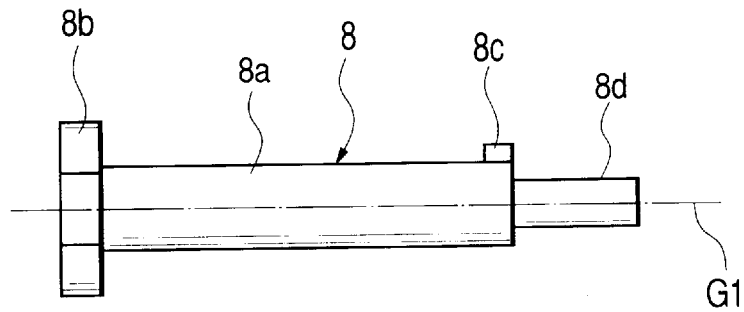
FIG. 8 is a side view of the operating shaft according to the EGR sensor of the present invention.
Figure 9:
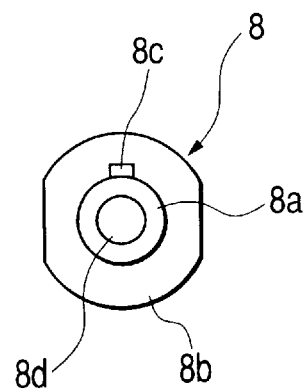
FIG. 9 is a front view of the operating shaft according to the EGR sensor of the present invention.
Figure 10:
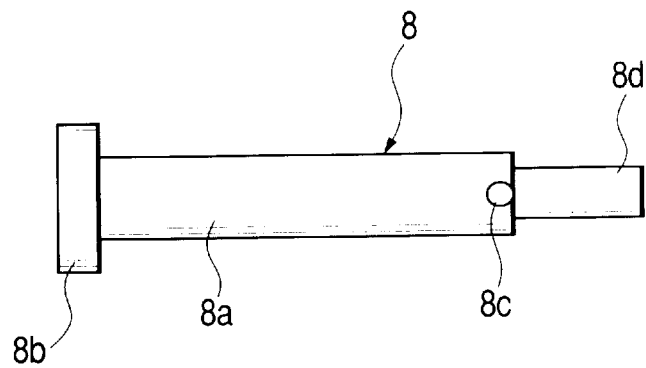
FIG. 10 is a plan view of the operating shaft according to the EGR sensor of the present invention.
Figure 11:
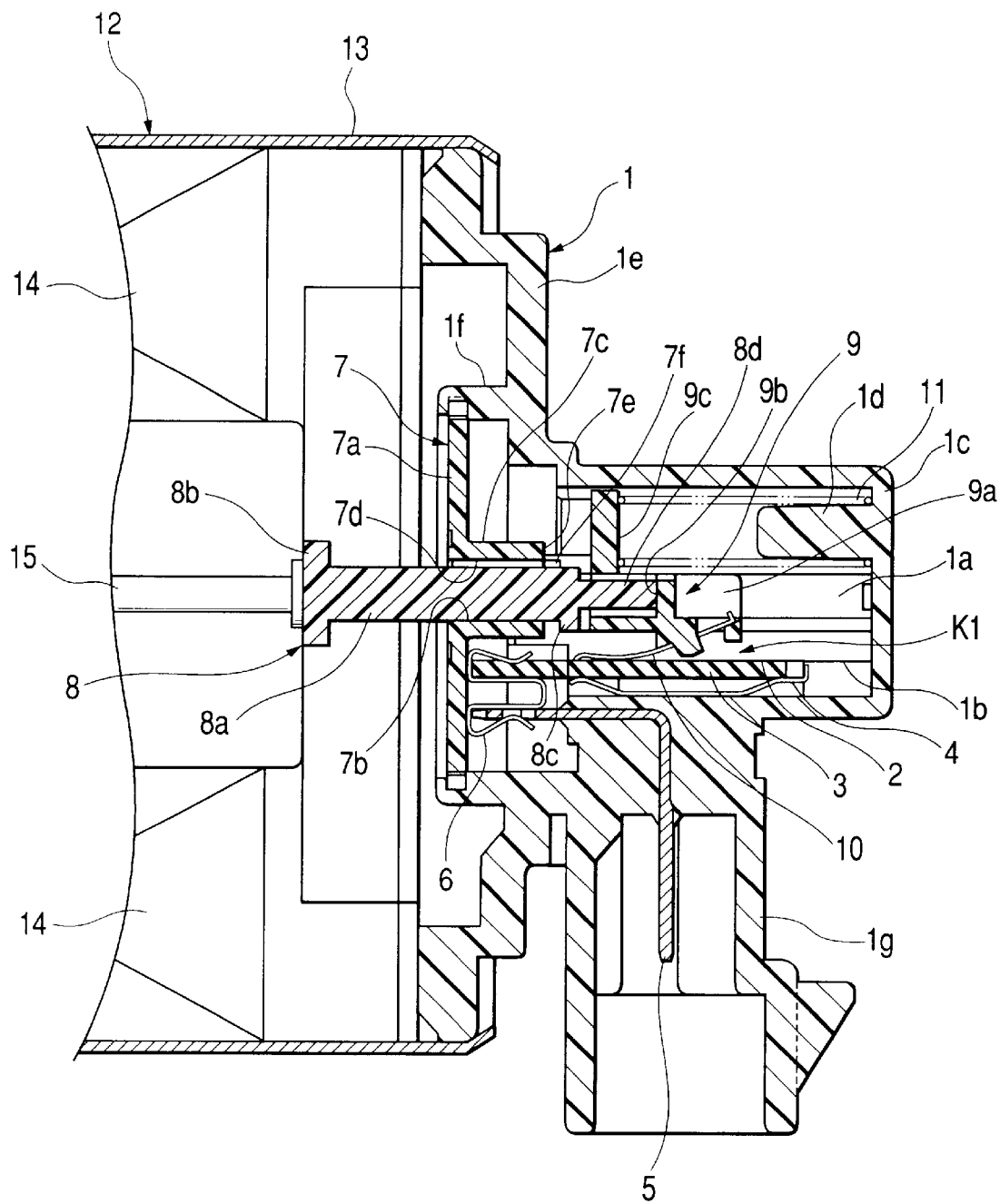
FIG. 11 is a cross-sectional view of an essential portion of the EGR sensor of the present invention assembled into an automobile.
Figure 12:
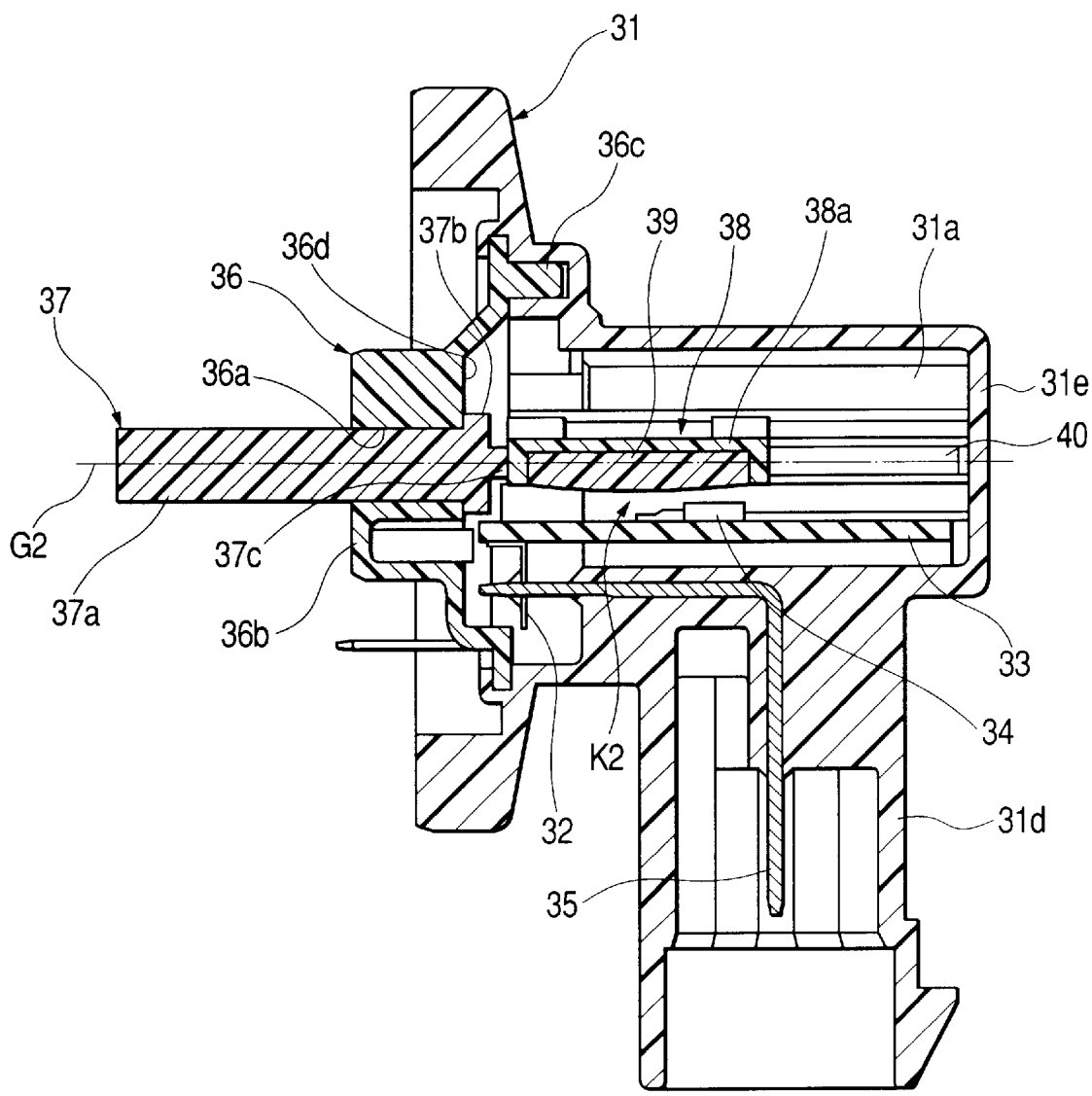
FIG. 12 is a cross-sectional view of a conventional EGR sensor viewed from the side thereof.
Figure 13:
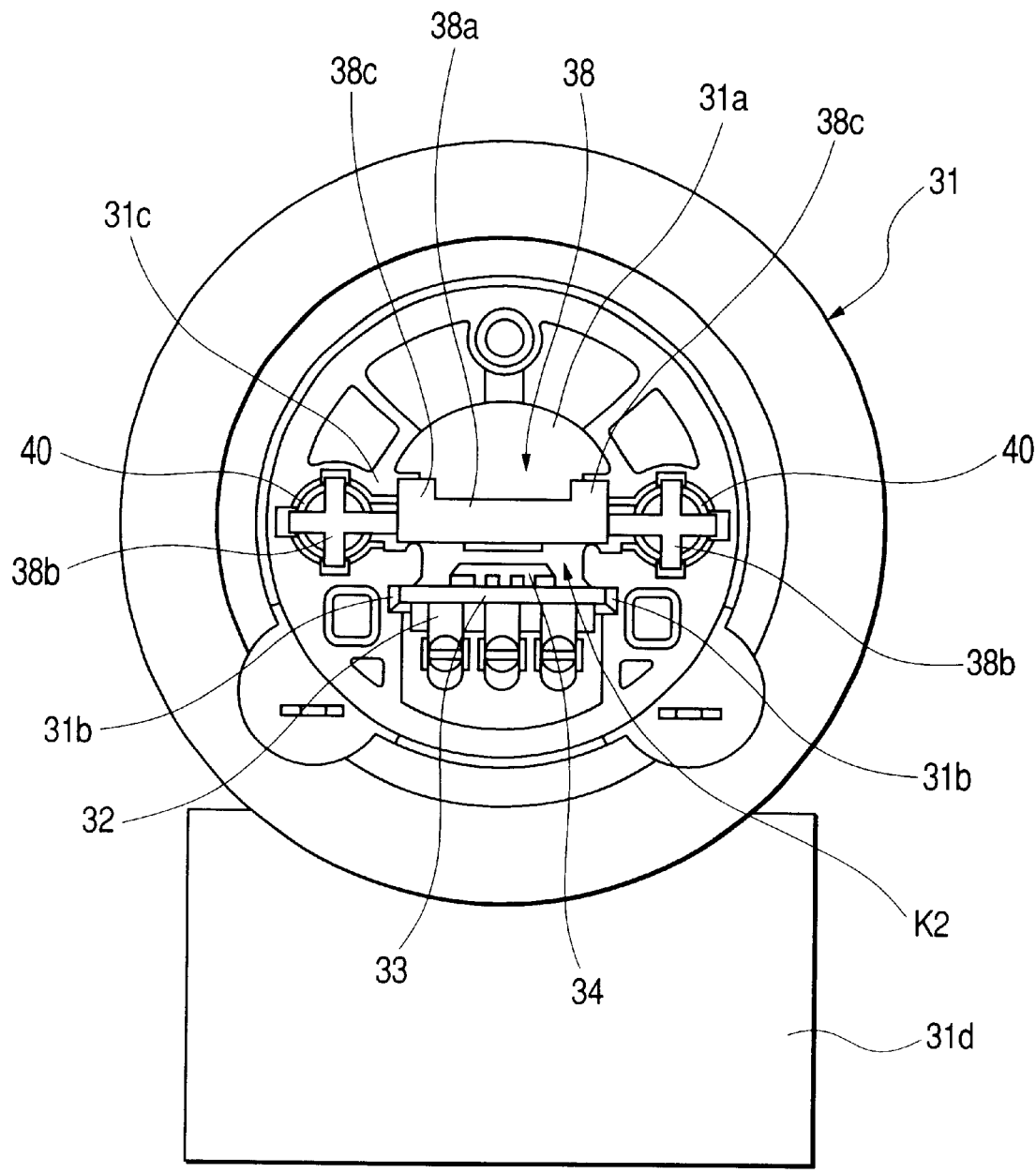
FIG. 13 is a front view of the conventional EGR sensor from which a cover and an operating shaft are removed.
Figure 14:
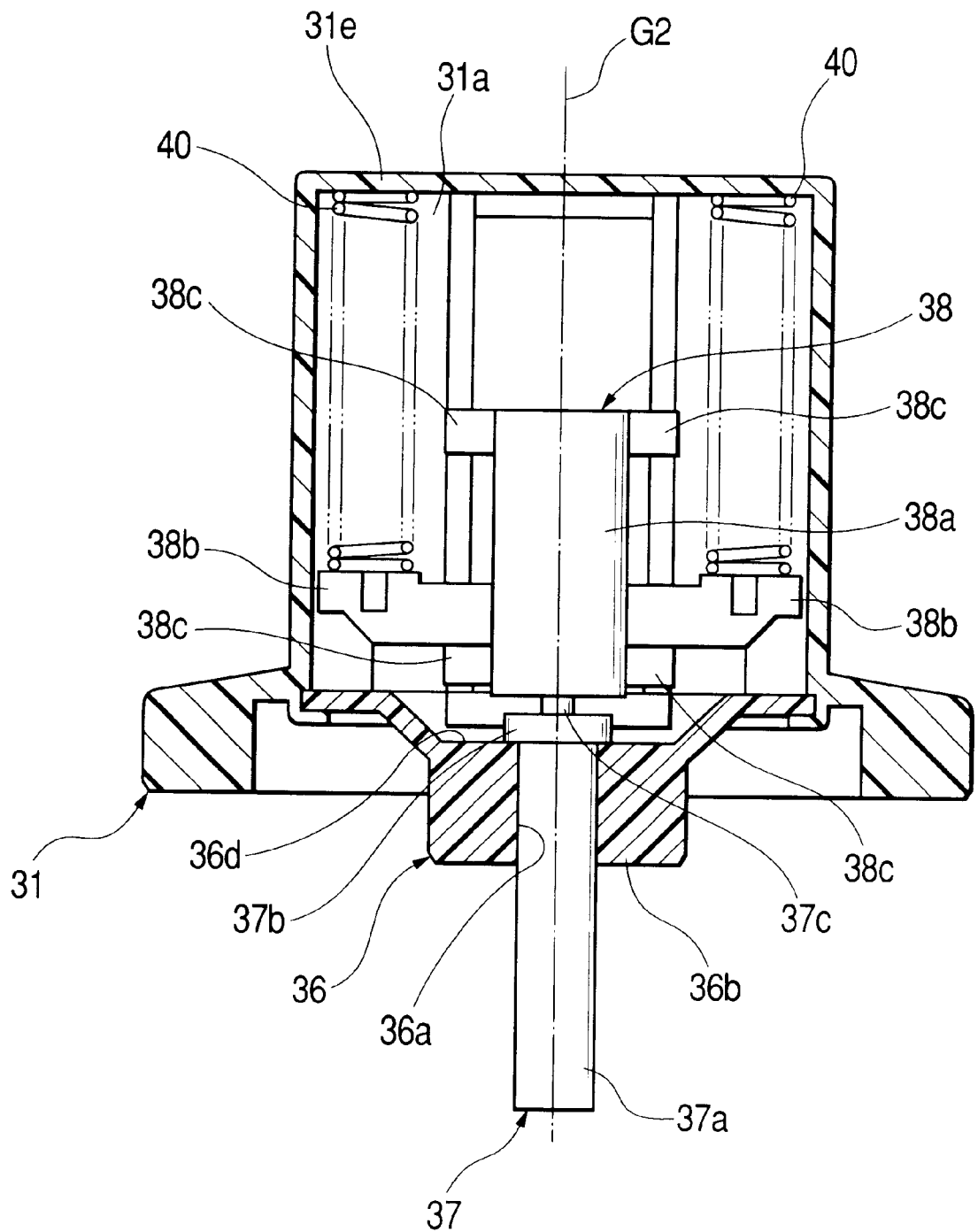
FIG. 14 is a cross-sectional view of an essential portion of the conventional EGR sensor viewed from the top surface thereof.

FIG. 8 is a side view of the operating shaft according to the EGR sensor of the present invention. FIG. 9 is a front view of the operating shaft according to the EGR sensor of the present invention. FIG. 10 is a plan view of the operating shaft according to the EGR sensor of the present invention. FIG. 11 is a cross-sectional view of an essential portion of the EGR sensor of the present invention assembled into an automobile.

The construction of the EGR sensor of the present invention will be described with reference to FIGS. 1 to 11. A case 1 consisting of a mold of synthetic resin has a hollow housing portion 1a with its one side opened, a pair of concave shoulder portions 1b extending in the front to rear direction in the housing portion 1a, a convex portion 1d located in the housing portion 1a extending from a back surface wall 1c, a tubular mounting portion 1f provided in a front surface wall 1e, and a tubular portion 1g protruding in the direction orthogonal to the housing portion 1a.

An insulating substrate 3 provided with a resistor 2 is inserted into a pair of the shoulder portions 1b of the case 1, and is located in the housing portion 1a. The insulating substrate 3 is pushed by a spring 4 from its lower portion side so as to be pushed against the shoulder portions 1b.

The resistor 2 provided in the insulating substrate 3 is connected electrically to one end of an L-shaped pin 5 for connector embedded into the case 1 by a connection clip 6.

Particularly as shown in FIGS. 5 to 7, a cover 7 consisting of a mold of synthetic resin has a planar base portion 7a, a tubular bearing portion 7c extending from the center portion of the base portion 7a and having in its center portion a circular hole 7b, a concave portion 7d connected to the hole 7b and provided in the bearing portion 7c in an axial direction G1, and blocking portions 7f consisting of a pair of protrusions provided at both sides of the concave portion 7d in a rear end 7e of the bearing portion 7c.

The cover 7 is caulked onto the mounting portion 1f of the case 1 so as to cover the opening portion of the case 1.

Particularly as shown in FIGS. 8 to 10, an operating shaft 8 has a cylindrical shaft portion 8a, an oval stopper portion 8b provided in the front end of the shaft portion 8a, a convex portion 8c located in the rear side portion of the shaft portion 8a and protruding from the shaft portion 8a in the direction orthogonal to the axial direction G1, and a small-diameter portion 8d protruding from the rear end of the shaft portion 8a in the axial direction G1.

To assemble the operating shaft 8 into the cover 7, the operating shaft 8 is first located in the front of the cover 7 so as to match the shaft portion 8a with the hole 7b. Then, the convex portion 8c is matched with the concave portion 7d to be inserted from the rear side of the operating shaft 8 into the hole 7b and the concave portion 7d.

While the convex portion 8c comes off the rear end of the concave portion 7d, the operating shaft 8 is rotated, and the convex portion 8c is located out of the concave portion 7d.

The convex portion 8c is retained to the rear end 7e of the bearing portion 7c so as to prevent the operating shaft 8 from coming off toward the front side portion.

When the operating shaft 8 is rotated while the convex portion 8c is located in the rear end 7e, the convex portion 8c hits the blocking portions 7f higher than the rear end 7e to block movement of the convex portion 8c to the concave portion 7d.

A movable member 9 consisting of a mold of synthetic resin has a base portion 9a, a concave portion 9b provided in the center portion of the base portion 9a, and a spring receiving portion 9c extending upward from the base portion 9a.

In addition, the movable member 9 is provided in its lower portion with a slider 10 made of a metal plate.

The movable member 9 provided with the slider 10 is mounted onto the case 1 so as to be moved linearly in the housing portion 1a while the slider 10 is contacted with the resistor 2.

Though not shown herein, the movable member 9 is guided during movement by the guide portion provided in the case 1.

A variable resistor consisting of the resistor 2 and the slider 10 constructs detection means K1.

One coil spring 11 is located in the housing portion 1a. The convex portion 1d of the case 1 is fitted into the center portion thereof. One end of the coil spring 11 is contacted onto the back surface wall 1c, and the other end is contacted onto the spring receiving portion 9c of the movable member 9.

When the operating shaft 8 and the movable member 9 are assembled, the small-diameter portion 8d is located in the concave portion 9b of the movable member 9, as shown in FIG. 1. The coil spring 11 biases the movable member 9 forward, so that the movable member 9 is contacted resiliently onto the small-diameter portion 8d of the operating shaft 8. The operating shaft 8 is also pushed by the coil spring 11, so that the convex portion 8c is contacted onto the rear end 7e of the bearing portion 7.

A method of assembling the EGR sensor having such a construction will be described. The insulating substrate 3 is mounted in the housing portion 1a of the case 1, and then, the connection clip 6 is mounted to grip the insulating substrate 3 and the pin 5.

The coil spring 11 is fitted into the convex portion 1d of the case 1. The movable member 9 provided with the slider 10 is fitted into the guide portion in the housing portion 1a of the case 1. The cover 7 is caulked onto the case 1.

As shown in FIGS. 3 and 4, the cover 7 prevents the movable member 9 and coil spring 11 from coming off. In such a state, the operating shaft 8 is finally assembled.

To assemble the operating shaft 8, the operating shaft 8 is located in the front of the cover 7 so as to match the shaft portion 8a with the hole 7b. The convex portion 8c is matched with the concave portion 7d to be inserted from the rear side portion of the operating shaft 8 into the hole 7b and the concave portion 7d.

The operating shaft 8 is pushed in the axial direction G1. The small-diameter 8d slightly moves the movable member 9 rearward against the coil spring 11. While the convex portion 8c comes off the rear end of the concave portion 7d, the operating shaft 8 is rotated, and the convex portion 8c is located out of the concave portion 7d.

When the operating shaft 8 is released, the coil spring 11 retains the convex portion 8c through the movable member 9 to the rear end 7e of the bearing portion 7c, thereby preventing the operating shaft 8 from coming off toward the front side portion.

The EGR sensor of the present invention can be thus assembled.

The EGR sensor of the present invention having such a construction is carried to a set maker. During the carriage, when the operating shaft 8 is rotated by vibration or shock, the convex portion 8c hits the blocking portions 7f higher than the rear end 7e so as to block movement of the convex portion 8c to the concave portion 7d. The operating shaft 8 is thus prevented from coming off the bearing portion 7c.

A method for replacing the operating shaft 8 will be described. In the state of FIG. 1, the operating shaft 8 is pushed in the axial direction G1 so as not to retain the convex portion 8c to the blocking portion 7f. The operating shaft 8 is then rotated to match the convex portion 8d with the concave portion 7d.

When the operating shaft 8 is pulled out, the convex portion 8c passes through the concave portion 7d, whereby the operating shaft 8 cam be easily removed from the bearing portion 7c.

The operating shaft 8 to be replaced is mounted by the above mentioned method.

The operating shaft 8 can be replaced by such an easy method. In the case where the operating shaft 8 is found to be scratched in quality inspection for the EGR sensor, the operating shaft 8 can be easily replaced, and parts other than the operating shaft 8 can be used without being wasted.

The EGR sensor of the present invention having such a construction is assembled into a solenoid 12 by the set maker, as shown in FIG. 11.

The solenoid 12 is constructed of a metal case 13, a hollow coil 14 provided in the case 13, and a rod 15 provided in the center portion of the coil 14 and consisting of an iron core coupled to an EGR valve. The case 13 of the solenoid 12 is mounted onto the front surface wall 1e so as to assemble the solenoid 12 and the EGR sensor.

When both are assembled, the rod 15 is contacted resiliently onto the operating shaft 8 all the time, and the rod 15 pushes the operating shaft 8 to slightly move the movable member 9 rearward.

Further, when both are assembled, the convex portion 8c of the operating shaft 8 is pushed in so as not to be retained to the blocking portion 7f. The operating shaft 8 is contacted resiliently onto the rod 15 all the time. When the operating shaft 8 is rotated by vibration or shock, the operating shaft 8 is prevented from coming off the bearing portion 7c.

The operation of the EGR sensor of the present invention will be described. In the state shown in FIG. 11, the rod 15 of the solenoid 12 for driving the EGR valve of an automobile pushes the operating shaft 8 against the coil spring 11. The operating shaft 8 linearly moves the movable member 9 guided by the guide portion in the axial direction G1.

The slider 10 moves on the resistor 2. As a result, the detection means K1 varies the resistance value to detect an amount of the operating shaft 8 moved.

When pushing of the operating shaft 8 by the rod 15 is released, the coil spring 11 pushes back the movable member 9. The operating axis 8 is also pushed back into the original state by movable member 9, and is returned to the state as shown in FIG. 11.

The EGR sensor of the present invention can be thus operated.

In the above mentioned embodiment, the detection means K1 is described by the variable resistor consisting of the resistor 2 and the slider 10. The detection means K1, however, may be constructed of detection members such as the magnet and hole IC.

Further, in the above mentioned embodiment, the blocking portions 7f are provided in the rear end 7e of the bearing portion 7c. The blocking portions 7f may be eliminated, and the convex portion 8c of the operating shaft 8 may be retained to the rear end 7e.

In the EGR sensor of the present invention, the operating shaft 8 is provided in its rear side portion with the convex portion 8c protruding from the shaft portion 8a in the direction orthogonal to the axial direction G1, and the bearing portion 7c is provided with the concave portion 7d connected to the hole 7b through which the shaft portion 8a is inserted and allowing the convex portion 8c to be inserted therethrough in the axial direction G1. The convex portion 8c protruding from the rear end 7e of the bearing portion 7c is retained to the rear end 7e of the bearing portion 7c other than the concave portion 7d. The operating shaft 8 can be finally assembled. Like the coil spring 11, the movable member 9, and the cover 7, the operating shaft 8 can be assembled in a stacking manner. It is thus possible to provide an EGR sensor which has good productivity and is inexpensive, as compared with the conventional EGR sensor.

To replace the operating shaft 8, the operating shaft 8 is rotated to match the convex portion 8d with the concave portion 7d. When the operating shaft 8 is pulled out, the convex portion 8c passes through the concave portion 7d, whereby the operating shaft 8 can be easily removed from the bearing portion 7c. The operating shaft 8 can be easily replaced.

Thus, it is possible to provide an EGR sensor in which, in the case where the operating shaft 8 is found to cause quality deficiencies in quality inspection, the operating shaft 8 can be easily replaced, and parts other than the operating shaft 8 can be used without being wasted.

The rear end 7e of the bearing portion 7c is provided with the blocking portions 7f for blocking movement of the convex portion 8c the concave portion 7d. When the operating shaft 8 is rotated by vibration or shock during carriage, the convex portion 8c hits the blocking portions 7f higher than the rear end 7e so as to block movement of the convex portion 8c to the concave portion 7d. The operating shaft 8 is thus prevented from coming off the bearing portion 7c.

The blocking portions 7f are formed by protrusions provided at both sides of the concave portion 7d. When the operating shaft 8 is mounted onto the bearing portion 7c, the small rotation of the operating shaft 8 retains the convex portion 8c to the rear end 7e. The operation for mounting the same is easy.

What is claimed is:

1. An exhaust gas recirculation sensor comprising:
   an operating shaft movable linearly in the axial direction;
   a bearing portion for guiding movement of the operating shaft;
   a movable member movable linearly by the operating shaft;
   a spring member for returning movement of the movable member and biasing the movable member so as to resiliently contact the movable member onto the operating shaft;
   a case for guiding movement of the movable member; and
   detection means operated by movement of the movable member, wherein
   the operating shaft is provided in its rear portion with a convex portion protruding from a shaft portion in the direction orthogonal to the axial direction,
   the bearing portion is provided with a concave portion connected to a hole through which the shaft portion is inserted and allowing the convex portion to be inserted therethrough in the axial direction,.and
   the convex portion protruding from the rear end of the bearing portion is retained to the rear end of the bearing portion other than the concave portion.

2. The exhaust gas recirculation sensor according to claim 1, wherein the rear end of the bearing portion is provided with blocking portions for blocking movement of the convex portion to the concave portion.

3. The exhaust gas recirculation sensor according to claim 2, wherein the blocking portions are formed by protrusions provided at both sides of the concave portion.

* * * * *